US011267204B2

(12) United States Patent
Yokoyama et al.

(10) Patent No.: US 11,267,204 B2
(45) Date of Patent: Mar. 8, 2022

(54) JOINT TAPE, METHOD AND APPARATUS FOR CONNECTION OF PACKING FILM UTILIZING THE SAME

(71) Applicant: TAISEI LAMICK CO., LTD., Saitama (JP)

(72) Inventors: Naoki Yokoyama, Saitama (JP); Naoya Hamada, Saitama (JP); Tomohiro Shibasaki, Saitama (JP)

(73) Assignee: TAISEI LAMICK CO., LTD., Saitama (JP)

(*) Notice: Subject to any disclaimer, the term of this patent is extended or adjusted under 35 U.S.C. 154(b) by 35 days.

(21) Appl. No.: 16/580,599

(22) Filed: Sep. 24, 2019

(65) Prior Publication Data
US 2020/0223151 A1 Jul. 16, 2020

(30) Foreign Application Priority Data

Jan. 16, 2019 (JP) .............................. JP2019-005216

(51) Int. Cl.
*B29C 65/00* (2006.01)
*B29C 65/50* (2006.01)
(Continued)

(52) U.S. Cl.
CPC .......... *B29C 65/5042* (2013.01); *B29C 65/18* (2013.01); *B29C 65/02* (2013.01);
(Continued)

(58) Field of Classification Search
CPC ......... B29C 65/02; B29C 65/18; B29C 65/74; B29C 65/743; B29C 65/745;
(Continued)

(56) References Cited

U.S. PATENT DOCUMENTS 2,804,419 A * 8/1957 De Woskin .............. D06H 5/00
156/267
2,987,108 A * 6/1961 Kilmartin .......... B65H 19/1852
156/504
(Continued)

FOREIGN PATENT DOCUMENTS

JP 2009-154427 7/2009
KR 10-2010-0057479 A 5/2010
(Continued)

OTHER PUBLICATIONS

Korean Office Action, Korean Patent Office, Application No. 9-5-2020-061180486, dated Sep. 3, 2020.

*Primary Examiner* — Philip C Tucker
*Assistant Examiner* — Nickolas R Harm
(74) *Attorney, Agent, or Firm* — Greenblum & Bernstein, P.L.C.

(57) ABSTRACT

The present invention relates to a band-like joint tape for covering a butting portion formed by butting an end portion of a one packing film to an end portion of another packing film and connecting the respective end portions of these packing films to each other. The joint tape is comprised of a laminate film formed by adhering a joint layer to a support layer at a peelable state, and covered so as to face the joint portion to the butting portion and heat-sealed so that the joint layer is fused to the butting portion and the fused portion of the joint layer is peeled off from the support layer.

14 Claims, 7 Drawing Sheets

(51) Int. Cl.
  *B29C 65/18* (2006.01)
  *B29C 65/74* (2006.01)
  *B29C 65/02* (2006.01)
  *B29C 65/78* (2006.01)

(52) U.S. Cl.
  CPC ............ *B29C 65/74* (2013.01); *B29C 65/743* (2013.01); *B29C 65/745* (2013.01); *B29C 65/7832* (2013.01); *B29C 65/7841* (2013.01); *B29C 66/114* (2013.01); *B29C 66/12241* (2013.01); *B29C 66/853* (2013.01); *B29C 66/855* (2013.01)

(58) Field of Classification Search
  CPC ............ B29C 65/7832; B29C 65/7841; B29C 66/114; B29C 66/12241; B29C 66/1284; B29C 66/853; B29C 66/855
  See application file for complete search history.

(56) References Cited

U.S. PATENT DOCUMENTS

| | | | | |
|---|---|---|---|---|
| 3,956,045 A * | 5/1976 | Hoffman | .................. | B29C 65/38 156/73.4 |
| 3,976,240 A * | 8/1976 | Matrisian | ................ | B23K 20/10 228/5.1 |
| 4,214,933 A * | 7/1980 | Off | ....................... | A41D 27/245 156/238 |
| 5,232,529 A * | 8/1993 | Miyake | ................ | B29C 66/1142 156/73.4 |
| 5,863,381 A * | 1/1999 | Magota | .............. | B65H 19/1852 156/507 |
| 6,533,891 B1 * | 3/2003 | Kubinski | ............ | B29C 65/5042 156/304.1 |
| 6,814,827 B2 | 11/2004 | Futase | | |
| 7,381,457 B2 | 6/2008 | Futase | | |
| 7,960,002 B2 | 6/2011 | Futase | | |
| 8,281,839 B2 | 10/2012 | Futase | | |
| 2005/0186418 A1 * | 8/2005 | Fujii | ....................... | H01L 24/79 428/343 |
| 2010/0196666 A1 * | 8/2010 | Goglio | .................... | B29C 66/43 428/157 |
| 2012/0328824 A1 * | 12/2012 | Cartabbia | ........... | B29C 66/1122 428/104 |
| 2014/0311654 A1 * | 10/2014 | Hansen | ................... | B29C 65/08 156/73.1 |
| 2015/0050444 A1 * | 2/2015 | Bernet | ..................... | B44C 1/24 428/58 |

FOREIGN PATENT DOCUMENTS

| | | |
|---|---|---|
| KR | 10-2015-0005644 A | 1/2015 |
| KR | 10-2018-0043564 A | 4/2018 |
| WO | 2013-160170 A1 | 10/2013 |

* cited by examiner

JOINT TAPE, METHOD AND APPARATUS FOR CONNECTION OF PACKING FILM UTILIZING THE SAME

TECHNICAL FIELD

This invention relates to a joint tape used for connecting end portions of mutual packing films to each other, and a method and apparatus for connecting mutual packing films by utilizing such a joint tape.

RELATED ART

A packing film used for continuously or intermittently filling and packing a liquid, powder and granular material or the like by means of an automatic filling machine is frequently applied to the automatic filling machine at a state of winding to a predetermined length such as 1000 m, 2000 m, or the like (web roll) through a printing step, a lamination step, a slitter step and the like.

In the automatic filling machine, another new web roll is exchanged at a time of consuming the packing film from the web roll used. However, when the automatic filling machine is stopped in the exchange of the web rolls, the working efficiency is decreased, so that it is demanded to automatically interface the web rolls while continuing the packing operation through the automatic filling machine.

Patent Document 1, the applicant has previously proposed a method for connecting end portions of packing films to each other wherein a rear end portion of a preceding packing film (end portion) is butted to a front end portion of a succeeding packing film (start end portion) and a strap film comprised of a laminate film having a double-faced sealing property is fused to a sealant layer side in the butting portion and the preceding packing film is connected to the succeeding packing film through such a strap film.

PRIOR ART DOCUMENTS

Patent Documents

Patent Document 1: JP-A-2009-154427

SUMMARY OF THE INVENTION

Task to be Solved by the Invention

The strap film disclosed in Patent Document 1 can be preferably used when the web roll having a predetermined length is manufactured by interfacing the packing films as mentioned above. However, when the strap film is used for interfacing the web rolls in a production line of the automatic filling machine, it is necessary to provide a very complicated mechanism for reeling a narrow and thin strap film of about 5-30 mm toward a butting portion between the rear end portion of the preceding packing film and the front end portion of the succeeding packing film and further cutting the strap film in response to the length of the butting portion and also assists by a worker is inevitable. Further, when the strap film is cut after the fusion to the butting portion of the packing films, a snippet is generated and hence there is a possibility that the snippet is adhered to the packing film and mixed into a product. Therefore, the use of the strap film is not suitable in the method of automatically connecting the preceding packing film to the succeeding packing film in the production line of the automatic filling machine.

Therefore, the invention is concerned with a joint tape for connecting an end portion of a packing film to an end portion of another packing film and a method and an apparatus for connecting the packing films with such a joint tape and an object thereof is to propose a joint tape suitable for automatically connecting an end portion of a preceding packing film to an end portion of a succeeding packing film without requiring a worker in a production line while continuing a packing operation in an automatic filling machine and a method and an apparatus for connecting the packing films by utilizing such a joint tape.

Solution for Task

The inventors have made various studies for achieving the above object and hence the invention has been accomplished as mentioned below. That is, the invention is a joint tape for covering a butting portion formed by butting an end portion of a one packing film to an end portion of another packing film and connecting the respective end portions of these packing films to each other, wherein the joint tape is comprised of a laminate film formed by adhering a joint layer to a support layer at a peelable state, and covered so as to face the joint layer to the butting portion and heat-sealed so that the joint layer is fused to the hutting portion and the fused portion of the joint layer is peeled from the support layer.

In the joint tape according to the invention, the following constructions are more preferable solution means:

(1) the joint layer is provided with at least a base layer and a sealant layer, and a melting point of the sealant layer is lower than a melting point of the support layer;

(2) the joint layer is provided with a notch capable of easily separating in response to a width of either the one packing film or the another packing film;

(3) the support layer has a mechanical strength higher than that of the joint layer, and Also, the invention proposes a method for connecting an end portion of a one packing film to an end portion of another packing film to each other with a joint tape, wherein the end portion of the one packing film is butted to the end portion of the another packing film, and the joint tape is comprised of a joint layer and a support layer and run out so as to face the joint layer to the hutting portion and pushed to the butting portion through a heat sealer to conduct heat sealing by heating under a pressure to thereby fuse only the joint layer to the butting portion, and the fused portion of the joint layer to the butting portion is peeled from the support layer by releasing the pushing through the heat scaler in the end of the heat sealing.

In the connecting method of packing films according to the invention, the following constructions are more preferable solution means:

(1) the end portion of the one packing film is butted to the end portion of the another packing film by cutting an overlapped portion of the one packing film and the another packing film over a full width thereof; and (2) the joint tape is run out toward the butting portion by rotating a feed reel wound with a non-used joint tape and a recovery reel for winding the support layer which the joint layer is peeled off due to the fusion of the joint layer to the butting portion between the one packing film and the another packing film.

Further, the invention is an apparatus for connecting an end portion of a one packing film to an end portion of another packing film with a joint tape comprised of a joint layer and a support layer, comprising a film end holding mechanism for holding the end portion of the one packing film and the end portion of the another packing film at a butting state, a joint tape feeding mechanism for running out a band-shaped joint tape along the butting portion between the end portion of the one packing film and the end portion of the another packing film so as to face a joint layer of the joint tape to the butting portion, and a heat sealing mechanism for pushing the joint tape to the butting portion to perform heat sealing by heating under a pressure and fuse only the joint layer to the butting portion.

In the connecting apparatus of the packing films according to the invention, the following constructions are more preferable solution means:

(1) the film end holding mechanism is provided with a film cutter for cutting an overlapped portion of the one packing film and the another packing film over a full width thereof to butt the end portion of the one packing film to the end portion of the another packing film;

(2) the joint tape feeding mechanism is provided with a feed reel wound with a non-used joint tape and a recovery reel for winding the support layer which the joint layer is peeled off due to the fusion of the joint layer to the butting portion between the one packing film and the another packing film;

(3) the joint tape feeding mechanism is provided with a joint tape cutting device for forming a separable notch in the joint layer of the joint tape in response to a width of either the one packing film or the another packing film; and (4) the film end holding mechanism is composed of one of a sucking means, an adsorbing means, a tacking means and a pressurizing means on a position near to at least the butting portion between the end portion of the one packing film and the end portion of the another packing film or a combination thereof.

Effect of the Invention

In the invention, the joint tape comprised of the joint layer and the support layer, which are adhered so as to easily peel off to each other, for example, by a thermal laminate process or with an adhesive having a low adhesion force, is pushed by means of a pair of heat sealers so as to cover the butting portion between the end portion of the one band-shaped packing film and the end portion of the another band-shaped packing film from both the surfaces and heat-sealed (heated under a pressure) to fuse only the joint layer to the butting portion, while the fused portion of the joint layer is peeled off from the support layer by releasing the pushing force of the heat sealers in the end of the heat sealing.

In the joint tape according to the invention, only the joint layer can be fused to the butting portion and the fused portion of the joint layer can be peeled off from the support layer. Therefore, for example, when the joint tape before the heat sealing is wound around the feed reel and the support layer after the heat sealing from which the fused portion of the joint layer is peeled off is wound around the recovery reel, even if the joint tape is made from a thin laminated plastic film or the like, the joint tape can be run to the butting portion automatically and accurately.

In the invention, the joint layer is provided at least with the base layer and the sealant layer and a material having a melting point lower than that of the support layer is used as the sealant layer, whereby only the sealant layer in the joint layer can be fused to the butting portion without melting the support layer during the heat sealing.

According to the invention, the notch is formed in the joint layer in response to the width of either the one packing film or the another packing film, whereby the portion of the joint layer fused to the butting portion is easily peeled off from the support layer, while the joint layer can be accurately fused to the butting portion and hence the one packing film can be strongly connected to the another packing film. In this case, the material having mechanical strength higher than that of the joint layer (tensile strength, elongation, tensile elastic modulus, compression strength, bending strength, impact strength, hardness and so on) is used as the support layer, whereby erroneous cutting of the support layer can be suppressed when the notch is formed in the joint layer.

EMBODIMENTS FOR CARRYING OUT THE INVENTION

An embodiment of the invention will be described with reference to the accompanying drawings below.

Figure 1:
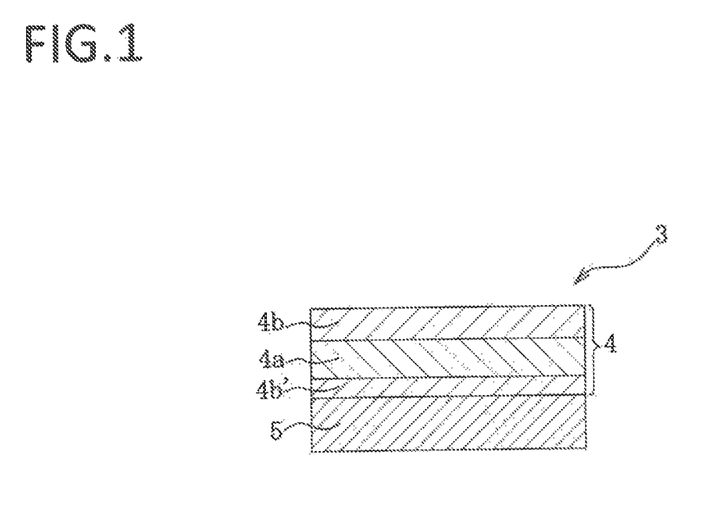
FIG. 1 is a section view illustrating an embodiment of the joint tape according to the invention.

FIG. 1 is a section view of a joint tape 3 according to the invention.

As shown in FIG. 1, the joint tape 3 is comprised of a joint layer 4 and a support layer 5. The joint layer 4 and the support layer 5 are laminated at an easily peelable state by a thermal laminate process or by a pressure bonding process or by applying an adhesive having a low adhesion force. Moreover, the adhesion strength between the joint layer 4 and the support layer 5 is not particularly limited, but is preferably 0.01 N/10 mm-50 N/10 mm, more preferably 0.02 N/10 mm-30 N/10 mm, which can prevent an unintended peeling in the handling and the like.

The joint layer 4 is at least comprised of a base layer 4a and sealant layers 4b, 4b'. As shown in FIG. 1, the sealant layers 4b, 4b' are preferable to be arranged so as to sandwich the base layer 4a from both the front and rear faces therebetween. Moreover, the sealant layer 4b' located at the side of the support layer 5 has a function as an adhesive for adhering the joint layer 4 to the support layer 5. Further-more, a thermoplastic resin such as polyethylene or the like may be laminated as an adhesive between the sealant layer 4b' and the support layer 5.

As the base layer 4a in the joint layer 4, it is preferable to use nylon, polyethylene terephthalate, polypropylene, alumina-deposited polyethylene terephthalate, silica-deposited polyethylene terephthalate, aluminum-deposited polyethylene terephthalate or the like. As the sealant layers 4b, 4b', it is preferable to use polyolefin, ethylene-vinyl acetate copolymer, ethylene-ethyl acrylate copolymer, ethylene-acrylic acid copolymer, ethylene-methacrylic acid copolymer, ethylene methyl methacrylic acid copolymer, ionomer or the like. The thickness of the joint layer 4 is not particularly limited, but is preferable to be 25-50 μm.

As the support layer 5 may be a plastic film such as nylon, polyethylene terephthalate, polypropylene or the like, paper, cloth, metallic foil and so on. A releasing treatment may be applied to these materials. The thickness of the support layer 5 is not particularly limited, but is preferable to have appropriate stiffness in view of the handling.

Figure 2:
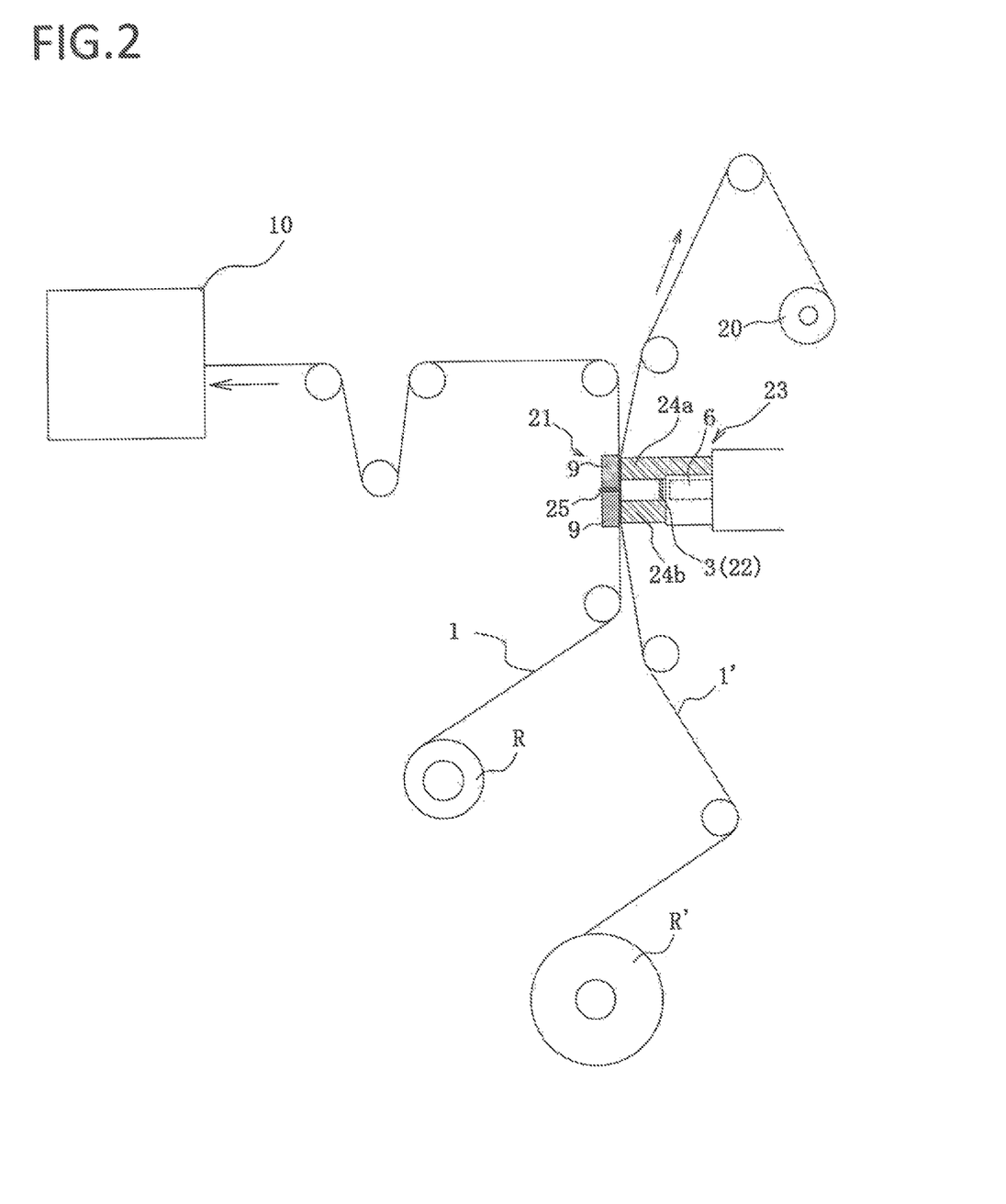
FIG. 2 is a schematic view illustrating a connecting apparatus of packing films according to the invention.

As an embodiment of the connecting method with the joint tape 3 will be described a case of connecting an end portion (rear end portion) of a one packing film 1 (hereinafter called as "preceding film 1") fed from a one web roll R for packing film used in a filling and packing machine to an end portion (front end portion) of another packing film 1' (hereinafter called as "succeeding film 1'") fed from another web roll R' as shown in FIG. 2.

The preceding film 1 is continuously fed from the web roll R to a filling and packing machine 10, while the succeeding film 1' is wound around the web roll R' at a waiting state. The succeeding film is run out by winding an end thereof around a winding roll 20 through plural rollers.

An apparatus for connecting the preceding film 1 to the succeeding film 1' comprises a film end holding mechanism 21 for mainly holding the rear end portion of the preceding film 1 to the front end portion of the succeeding film 1' at a butting state thereof, a joint tape feeding mechanism 22 for running out the joint tape 3 along a butting portion 2 between the rear end portion of the preceding film 1 and the front end portion of the succeeding film 1' so as to face joint layer 4 to the butting portion 2, and a heat sealing mechanism 23 for pushing the joint tape 3 onto the butting portion 2 to conduct heat sealing b heating under a pressure to thereby fuse only the joint layer 4 to the butting portion 2. Each of these mechanisms 21-23 will be described according to the process of connecting the preceding film 1 to the succeeding film 1' below.

There will be first described a method of butting the rear end portion of the preceding film 1 to the front end portion of the succeeding film 1' automatically and accurately. The method of butting the rear end portion of the preceding film 1 to the front end portion of the succeeding film 1' by overlapping the preceding film 1 with the succeeding film 1' and cutting the overlapped portion over a full width thereof is shown as an example, but any methods may be used as long as the rear end portion of the preceding film 1 can be accurately butted to the front end portion of the succeeding film 1'.

During the filling and packing operation in the filling and packing machine 10, when the decrease in the remaining amount of the preceding film 1 of the web roll R is detected, for example, in a control unit of the filling and packing machine 10, the winding roll 20 is driven to run out the succeeding film 1' from the web roll R' along the preceding film 1.

Chuck members 24a, 24b are arranged at a side of the succeeding film 1' at a state of separating from up and down in the longitudinal direction thereof, and seal-receiving members 9 are arranged at positions opposite to the respective chuck members 24a, 24b, and the preceding film 1 and the succeeding film 1' are sandwiched between these members. At first, the chuck members 24a, 24b are moved forward to push the succeeding film 1' onto the preceding film 1 and clamp the preceding film 1 and succeeding film at an overlapped state by the chuck members 24a, 24b and the seal-receiving members 9. Moreover, it is preferable that a constant quantity of the succeeding film 1' is wound around a winding roll 20 to correct wrinkles, twist, curling and the like generated in the succeeding film 1' prior to the pushing operation by the chuck members 24a, 24b. (FIG. 2 shows a state of moving the chuck members 24a, 24b forward to push the preceding film 1 and the succeeding film 1' at an overlapped state toward the seal-receiving members 9.)

Then, a film cutter 25 built in the seal-receiving member 9 is moved toward the overlapped portion between the preceding film 1 and the succeeding film 1' pushed with the chick members 24a, 24b and the overlapped portion is cut over the full width at an approximately central position between the chuck members 24a and 24b arranged above and below to accurately butt the rear end portion of the preceding film 1 to the front end portion of the succeeding film 1'.

Moreover, it is preferable that the preceding film 1 and the succeeding film 1' after the cutting with the film cutter 25 are collected by winding or the like. For example, the succeeding film located at the side of the winding roll 20 after the cutting is wound around the winding roll 20, while the preceding film 1 located at the side of the web roll R after the cutting is collected by winding around the web roll R, whereby automation of the connecting operation can be attained without interrupting the connecting operation of the following joint tape 3 with the preceding film 1 and the succeeding film 1' after the cutting.

Figure 4:
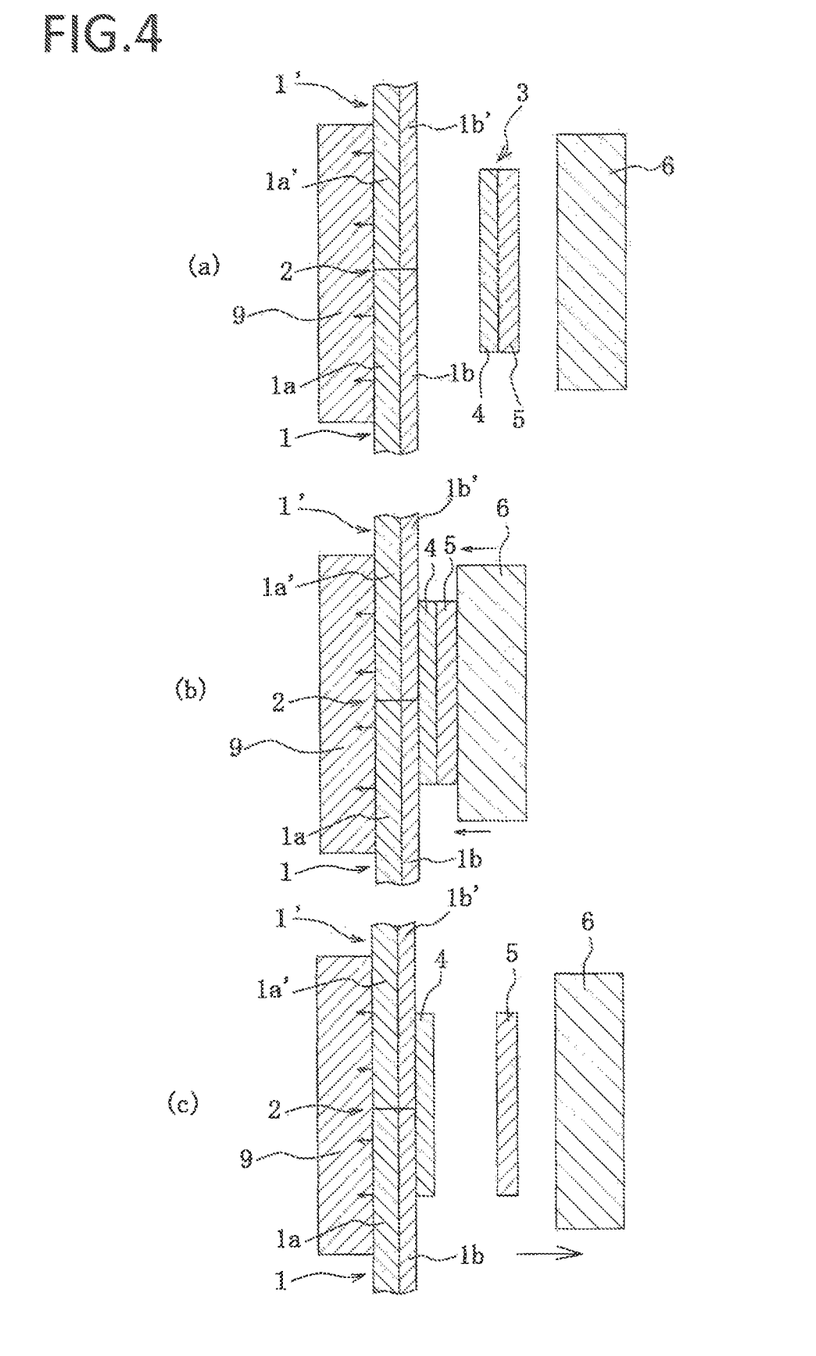
FIG. 4 is a diagrammatic view showing a connecting method with a joint tape according to the invention, wherein (a) is a state before fusion of the joint tape to the butting portion, (b) is a state during fusion of the joint tape to the butting portion and (c) is a state in the end of fusion of the joint tape to the butting portion.

When the film end holding mechanism 21 for holding the state of butting the rear end portion of the preceding film 1 to the front end portion of the succeeding film is comprised, for example, of a suction means connected to the known negative-pressure generating device as shown in FIG. 4, the neighborhood of the butting portion 2 between the rear end portion of the preceding film 1 and the front end portion of the succeeding film F is fixed onto the seal-receiving members 9 by suction from openings formed, for example, in the surface of the seal-receiving member 9 as shown by an arrow in the figure, so that the butting state between the rear end portion of the preceding film 1 and the front end portion of the succeeding film is held even after the cutting with the film cutter 25.

As the film end holding mechanism 21 can be used various means such as the means for holding at least the neighborhood of the butting portion 2 between the preceding film 1 and the succeeding film 1' onto the seal-receiving members 9 by sucking under a negative pressure as mentioned above, means for holding the neighborhood of the butting portion 2 onto the seal-receiving members 9 by pressuring with pressurized air or the like, means for holding onto the self-receiving members 9 by using an adhesive and so on, means for holding onto the seal-receiving members 9 by adsorbing with magnetic force, static electricity or suction disc and so on. These means may be combined plurally.

Then, the joint tape 3 is run out along the butting portion 2 between the preceding film 1 and the succeeding film 1' by the joint tape feeding mechanism 22. As shown in FIG. 2, the joint tape 3 is located between the chuck members 24a and 24b. Moreover, the preceding film 1 and the succeeding film 1' are comprised of at least base layers 1a, 1a' and sealant layers 1b, 1b', and the joint tape 3 is run out so as to face a joint layer 4 of the joint tape 3 to the butting portion 2 at the sealant layers 1b, 1b' side as shown in FIG. 4(a).

Figure 3:
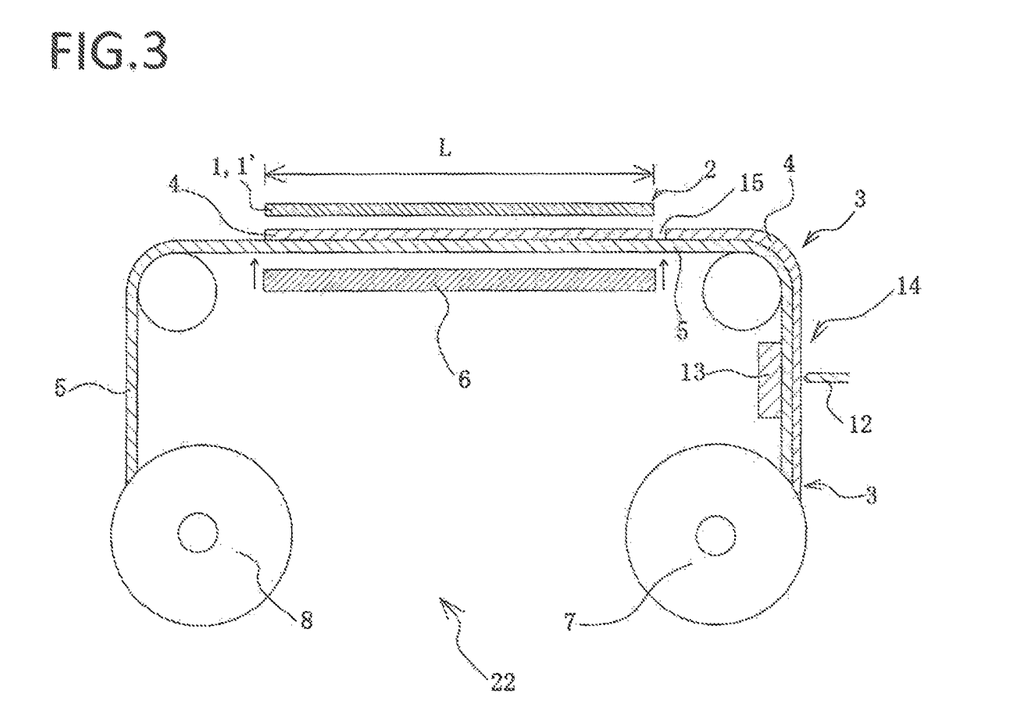
FIG. 3 is a diagrammatic view showing a connecting method with a joint tape according to the invention, which shows a section in a butting portion between a rear end portion of a preceding packing film and a front end portion of a succeeding packing film.

In FIG. 3 is shown details of the joint tape feeding mechanism 22 as a section view along the butting portion 2 between the preceding film 1 and the succeeding film 1'.

The joint tape feeding mechanism 22 comprises a feed reel 7 wound with the joint tape 3 and a recovery reel 8 winding the joint tape 3 run out from the feed reel 7. Thus, the joint tape 3 can be accurately run out along the butting portion 2. Moreover, a motor is built in the recovery reel 8. The predetermined length of the joint tape 3 is run out from the feed reel 7 by the driving of the motor at a given timing. For example, the joint tape 3 can be run out at a state of applying tension by using a brake or the like at the side of the feed reel 7.

Subsequently, a heat sealer 6 located behind the joint tape 3 and constructing the heat sealing mechanism 23 is moved forward to push the joint tape 3 onto the butting portion 2 as shown in FIG. 4(b), and heating under a pressure is conducted to fuse the joint layer 4 (sealant layer 4b) of the joint tape 3 to the sealant layers 1b, 1b' of the butting portion 2. As the heat sealer 6 can be used anything as long as heat scaling can be performed by pushing the joint tape 3 along the full length of the butting portion. For example, an impulse seal, a high-frequency welder seal, a supersonic seal or the like can be used.

Moreover, the rear end portion of the preceding film 1 and the front end portion of the succeeding film 1' are connected to each other in the butting portion by mutual fusion between the sealant layers 1b, 1b' of the preceding and succeeding films 1 and 1' and the sealant layer 4b of the joint layer 4, so that both the films can be strongly connected to each other at a high strength.

Thereafter, the heat sealer 6 is returned to the original position to release the pushing toward the joint tape 3 as shown in FIG. 4(c), whereby the fused portion of the joint layer 4 to the butting portion 2 is peeled from the joint tape 3 (support layer 5). This is considered on the fact that since an adhesion force between the joint layer 4 and the support layer 5 is weak, when the joint tape 3 is returned to the original position by releasing from the pushing of the heat sealer 6, the adhesion force between the joint layer 4 and the support layer 5 becomes weaker than the fusion force between the joint layer 4 and the butting portion 2 to peel the joint layer 4 from the support layer 5.

Moreover, the joint layer 4 is fused to the butting portion 2 to peel the joint layer 4 in the fused portion from the support layer 5, while the holding operation of the film end holding mechanism 21 (adsorption onto the surface of the seal-receiving members 9 by suction means in this embodiment) and the pushing by the chuck members 24a, 24b are released, whereby it is made possible to run the succeeding film 1' connected to the preceding film 1 into the filling and packing machine 10.

Figure 5:
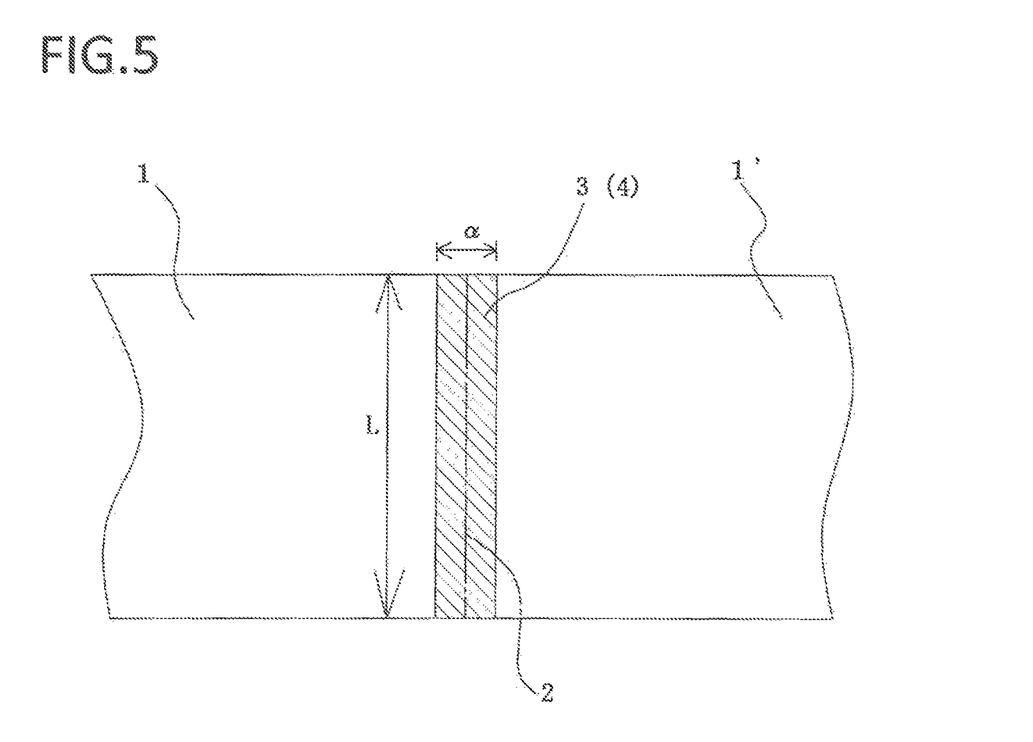
FIG. 5 is a schematic view illustrating a state of connecting a preceding packing film to a succeeding packing film with a joint layer.

Thus, the preceding film 1 and the succeeding film 1 are strongly connected to each other by the fusion between the sealant layers 1b, 1b' in the butting portion 2 and the sealant layer 4b of the joint layer 4. Moreover, a width a of the joint tape 3 is enough to cover the butting portion 2 as shown in FIG. 5 and is preferably 5-25 mm, more preferably 7-15 mm.

As shown in a left side of FIG. 3, the joint tape 3 composed of only the support layer 5 after the peeling of the joint layer 4 is wound around the recovery reel 8, and a new joint tape 3 run out from the feed reel 7 is at a waiting state for next connecting operation associated therewith.

Figure 6:
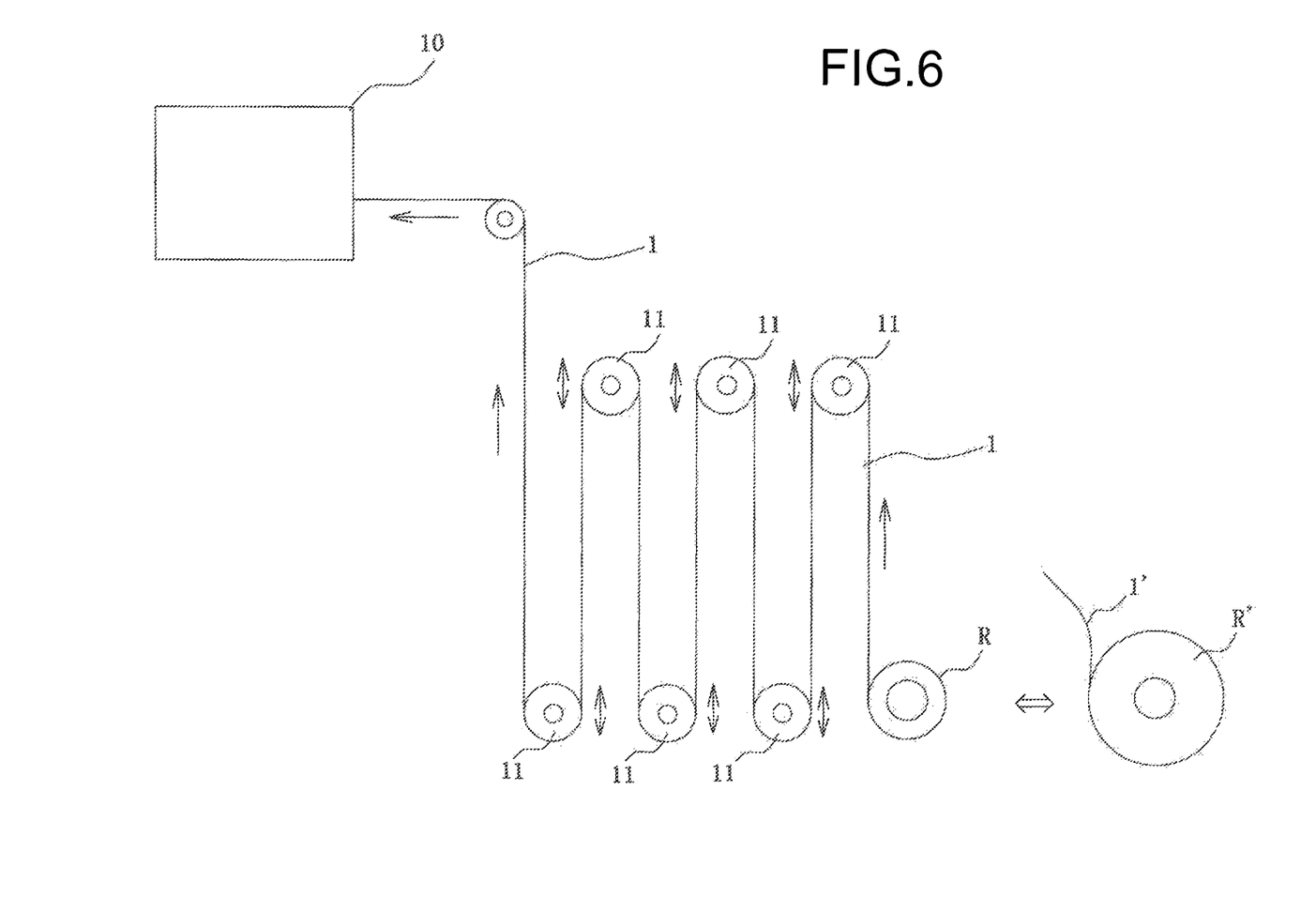
FIG. 6 is a diagrammatic view showing an example of the method of connecting a preceding packing film to a succeeding packing film while continuously operating a filling and packing machine.

The connection between the preceding film 1 and the succeeding film is preferable to be automatically performed in the production line during the filling and packing operation of the filling and packing machine 10. For example, when the decrease in the residual amount of the preceding film 1 in the web roll R is detected in the control unit of the filling and packing machine 10, as shown in FIG. 6, plural dancer rollers 11 arranged between the web roll R and the filling and packing machine 10 are moved up and down to play a role as a buffer for the preceding film 1. The interval between the up and down dancer rollers 11 is made narrow to stop feeding of the preceding film 1 from the web roll R during the feeding of the preceding film 1 from the buffer to the filling and packing machine 10 and automatically perform the above-mentioned connecting operation, whereby the connection of the preceding film 1 to the succeeding film 1' can be conducted while continuously operating the filling and packing machine 10 without stopping.

In order to fuse only the joint layer 4 of the joint tape 3 to the sealant layers 1b, 1b' of the butting portion 2, it is preferable to use a material having a melting point lower than that of the support layer 5 as the sealant layer 4b constituting the joint layer 4. Thus, the fusion of the support layer 5 to the butting portion 2 can be suppressed by adjusting a heat sealing temperature of the heat sealer 6 (higher than the inciting point of the sealant layer 4b of the joint layer 4 but lower than the melting point of the support layer 5).

In order to make easy the peeling of the joint layer 4 in the fused portion from the joint tape 3, it is preferable that a cutter device 14 for the joint tape may be disposed as shown in FIG. 3, whereby a notch 15 is previously formed in only the joint layer 4 in response to the width L of the preceding film 1 and succeeding film 1' (length of the butting portion 2). In this case, the fused portion of the joint layer 4 can be peeled off easily from the joint tape 3 through the notch 15, while the preceding film 1 and the succeeding film 1' can be strongly connected to each other by accurately fusing the joint layer 4 in response to the length of the butting portion 2.

In FIG. 3 is shown a case that the widths of the preceding film 1 and the succeeding film 1' are same. However, the widths of the preceding film 1 and the succeeding film 1' may be different from each other. In the latter case, it is preferable to form the notch 15 in the joint layer 4 of the joint tape 3 in response to the width of either the preceding film 1 or the succeeding film P.

Figure 7:
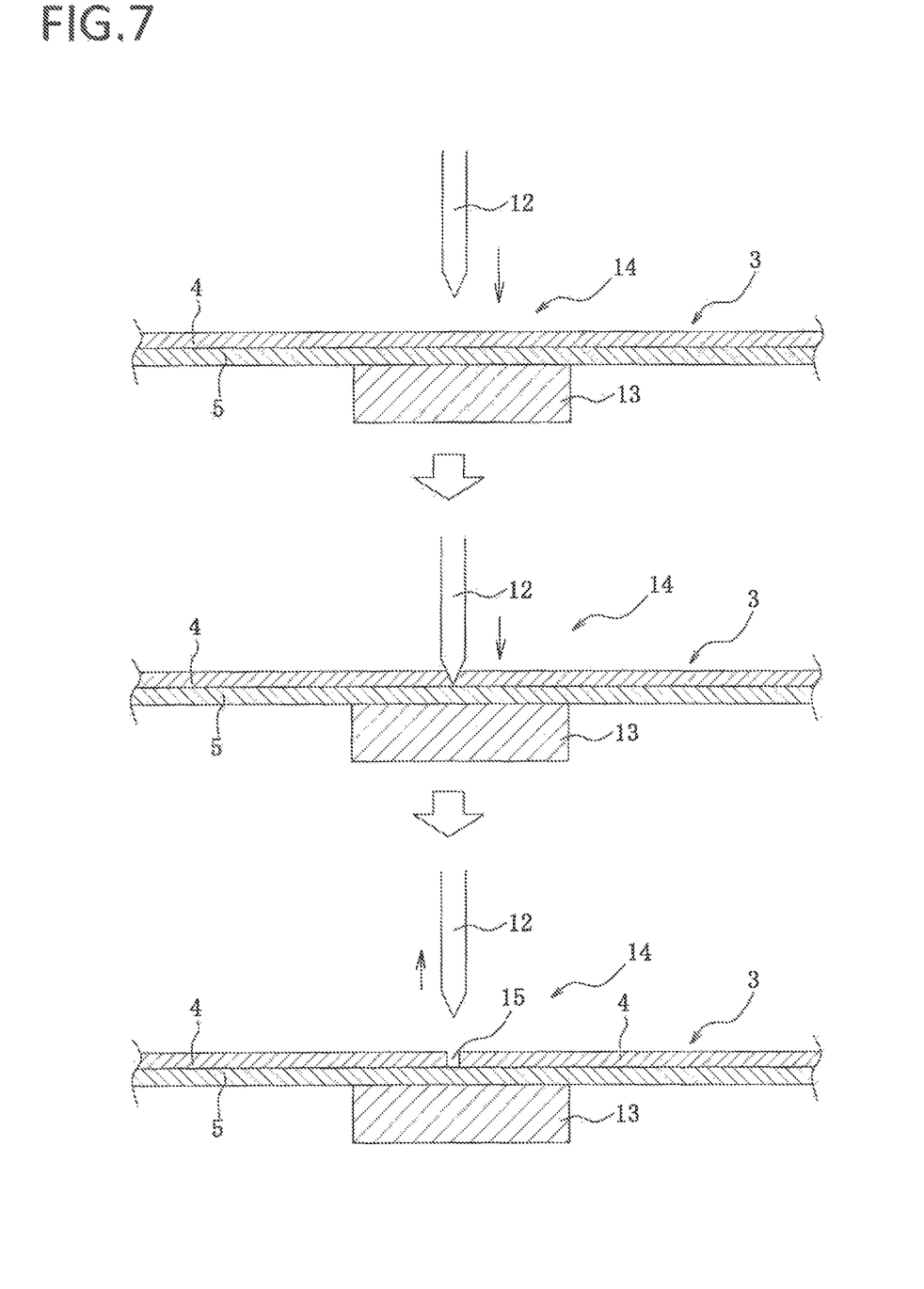
FIG. 7 is a schematic view showing a method of forming a notch in a joint layer of the joint tape according to the invention.

As enlargedly shown in FIG. 7, the cutter device 14 for the joint tape is comprised of a cutter 12 and a support base 13 arranged so as to sandwich the joint tape 3, which are constructed by moving the cutter 12 toward the cradle 13 to sandwich the joint tape 3 between a tip of the cutter 12 and the cradle 13 and cutting only the joint layer 4. Moreover, the cutting depth of the joint tape 3 may be adjusted properly, for example, by changing the pushing force of the cutter 12, a material of the cradle 13, an applying way of the cutter 12 to the joint tape 3 or the like.

Especially, when a material having a mechanical strength higher than that of the joint layer 4 is used as the support layer 5 of the joint tape 3, the pushing force of the cutter 12 and the like are adjusted easily, and the erroneous cutting of the support layer 5 by the cutter 12 can be suppressed.

Moreover, the mechanical strength includes, for example, a tensile strength, an elongation, a tensile modulus, a compression strength, a bending strength, an impact strength, a hardness and the like.

As the cradle 13 can be used anything as long as only the joint layer 4 of the joint tape 3 can be cut by adjusting the pushing force of the cutter 12 in the cutting of the joint tape 3. For example, there can be used a plastic material such as PPS, PET, ABS, MC nylon, fluorine resin or the like, and a rubbery material such as urethane rubber, fluorine rubber, nitrile rubber or the like.

As a means for measuring and controlling a feeding amount of the joint tape 3 is preferable to arrange an encoder in a mounting shaft of the feed reel 7. A motor of the recovery reel 8 for the joint tape 3 is driven in accordance with instruction of the encoder to control the feeding amount of the joint tape 3 in response to the width of the preceding film 1 and/or the succeeding film 1', whereby the the cutting position by the cutter 12 can be determined automatically. Thus, even when the widths of the preceding film 1 and the succeeding film 1' to be connected are changed, the feeding amount of the joint tape 3 and the cutting position by the cutter 12 can be determined automatically only by setting the widths of the preceding film 1 and the succeeding film 1'.

Moreover, two notches 15 (both end portions) are funned accurately in the joint layer 4 of the joint tape 3 by the cutter 12 in response to the width of either the preceding film 1 or the succeeding film 1' as shown in FIG. 3. Alternatively, the joint layer 4 is cut so as to be made longer than the width of the preceding film 1 and the succeeding film and fused to the butting portion 2 and thereafter only a portion protruding from the butting portion 2 (extra portion) may be cut.

In order to promote the peeling of the fused portion in the joint layer 4 from the joint tape 3 (support layer 5) along the notch 15, it is more preferable to arrange an assisting mechanism for peeling such as jetting a gas such as air or the like toward the notch 15, arrangement of a roller or a rod therebetween, or gradual releasing of pushing pressure from one longitudinal direction of the heat sealer 6.

INDUSTRIAL APPLICABILITY

The joint tape, connection method and apparatus of packing film according to the present invention can be widely used in a joining field of a laminate film such as various filling and packing machines of continuously filling and packing a liquid, viscous or granular packaging material into a packaging bag made of a laminate film, a machine for manufacturing a packaging bag, a slitter device or the like.

DESCRIPTION OF REFERENCE SYMBOLS

1 preceding film
1' succeeding film
1a, 1a' base layer
1b, sealant layer
2 butting portion
3 joint tape
4 joint layer
4a base layer
4b, 4b' sealant layer
5 support layer
6 heat sealer
7 feed reel
8 recovery reel
9 seal-receiving member
10 filling and packing machine
11 dancer roller
12 cutter
13 support base
14 cutter device for joint tape
15 notch
20 winding roll
21 film end holding mechanism
22 joint tape feeding mechanism
23 heat sealing mechanism
24a, 24b chuck member
25 film cutter
R, R' web roll

What is claimed is:

1. An apparatus for connecting an end portion of one packing film to an end portion of another packing film to each other with a joint tape, the apparatus comprising:
    a film end holder to position the end portion of the one packing film and the end portion of the another packing film at a butting position in which a butting portion is formed by butting the end portion of the one packing film to the end portion of the another packing film,
    a joint tape feeder to run out the joint tape, which is band-shaped and is comprised of a laminate film formed by adhering a joint layer to a support layer so as to be peelable from one another, along the butting portion between the end portion of the one packing film and the end portion of the another packing film so as to face the joint layer of the joint tape to the butting portion, to cover the butting portion with the joint tape, and to connect the respective end portions of the packing films with the joint tape, and
    a heat sealer to push the joint tape to the butting portion to perform heat sealing by heating under a pressure and to fuse only the joint layer to the butting portion so that a fused portion of the joint layer is peelable from the support layer,
    wherein the film end holder includes a film cutter to cut an overlapped portion of the one packing film and the another packing film over a full width of the overlapped portion to butt the end portion of the one packing film to the end portion of the another packing film.

2. A method for connecting an end portion of a one packing film to an end portion of another packing film to each other with a joint tape using the apparatus for connecting the packing films as claimed in claim 1, the method comprising:
    butting the end portion of the one packing film is butted to the end portion of the another packing film,
    running out the joint tape that is comprised of the joint layer and the support layer so as to face the joint layer to the butting portion,
    pushing the joint tape to the butting portion through the heat sealer to conduct the heat sealing by heating under the pressure to thereby fuse only the joint layer to the butting portion, and
    peeling the fused portion of the joint layer to the butting portion from the support layer by releasing the pushing through the heat sealer in an end of the heat sealing.

3. The method for connecting the packing films according to claim 2 wherein the end portion of the one packing film is butted to the end portion of the another packing film by cutting the overlapped portion of the one packing film and the another packing film over the full width thereof.

4. The method for connecting the packing films according to claim 2, wherein the joint tape is run out toward the butting portion by rotating a feed reel wound with a non-used joint tape and a recovery reel for winding the support layer which the joint layer is peeled off due to the fusion of the joint layer to the butting portion between the one packing film and the another packing film.

5. The method for connecting the packing films according to claim 2, wherein the end portion of the one packing film is butted to the end portion of the another packing film by cutting the overlapped portion of the one packing film and the another packing film over the full width thereof, and the joint tape is run out toward the butting portion by rotating a feed reel wound with a non-used joint tape and a recovery reel for winding the support layer which the joint layer is peeled off due to the fusion of the joint layer to the butting portion between the one packing film and the another packing film.

6. The apparatus for connecting the packing films according to claim 1, wherein the joint tape feeder is to run out the joint tape so that the joint tape is sandwiched between the heat sealer and the butting portion.

7. The apparatus for connecting the packing films according to claim 1, wherein the apparatus is to connect the end portion of the one packing film to the end portion of the another packing film to each other with the joint tape having the joint layer include at least a base layer and a sealant layer, and a melting point of the sealant layer is lower than a melting point of the support layer.

8. The apparatus for connecting the packing films according to claim 1, wherein the apparatus is to connect the end portion of the one packing film to the end portion of the another packing film to each other with the joint tape having the joint layer include a notch that is separable.

9. The apparatus for connecting the packing films according to claim 1, wherein the apparatus is to connect the end portion of the one packing film to the end portion of the another packing film to each other with the joint tape having the support layer include a mechanical strength higher than that of the joint layer.

10. The apparatus for connecting the packing films according to claim 1, wherein the apparatus is to connect the end portion of the one packing film to the end portion of the another packing film to each other with the joint tape having:

the joint layer include at least a base layer and a sealant layer, and a melting point of the sealant layer is lower than a melting point of the support layer, the joint layer include a notch that is separable, and the support layer include a mechanical strength higher than that of the joint layer.

11. The apparatus for connecting the packing films according to claim 1, wherein the joint tape feeder includes a feed reel wound with a non-used joint tape and a recovery reel for winding the support layer which the joint layer is peeled off due to the fusion of the joint layer to the butting portion between the one packing film and the another packing film.

12. The apparatus for connecting the packing films according to claim 1, wherein the joint tape feeder includes a joint tape cutter to form a separable notch in the joint layer of the joint tape.

13. The apparatus for connecting the packing films according to claim 1, wherein the film end holder includes one of a sucker, an adsorber, a tacker and a pressurizer on a position near to at least the butting portion between the end portion of the one packing film and the end portion of the another packing film, or a combination thereof.

14. The apparatus for connecting the packing films according to claim 1, wherein the joint tape feeder includes a feed reel wound with a non-used joint tape and a recovery reel to wind the support layer which the joint layer is peeled off due to the fusion of the joint layer to the butting portion between the one packing film and the another packing film, the joint tape feeder includes a joint tape cutter to form a separable notch in the joint layer of the joint tape, and the film end holder includes one of a sucker, an adsorber, a tacker and a pressurizer on a position near to at least the butting portion between the end portion of the one packing film and the end portion of the another packing film, or a combination thereof.

* * * * *